US012441265B2

(12) United States Patent
Tse

(10) Patent No.: US 12,441,265 B2
(45) Date of Patent: Oct. 14, 2025

(54) MECHANISMS FOR MOVING A POD OUT OF A VEHICLE

(71) Applicant: Ho Keung Tse, Hong Kong (HK)

(72) Inventor: Ho Keung Tse, Hong Kong (HK)

( * ) Notice: Subject to any disclaimer, the term of this patent is extended or adjusted under 35 U.S.C. 154(b) by 147 days.

(21) Appl. No.: 17/578,487

(22) Filed: Jan. 19, 2022

(65) Prior Publication Data

US 2022/0134987 A1 May 5, 2022

Related U.S. Application Data

(63) Continuation-in-part of application No. 17/426,102, filed on Jul. 28, 2021.

(30) Foreign Application Priority Data

Mar. 1, 2021 (WO) .................. PCT/IB2021/051670
Dec. 5, 2021 (GB) ..................................... 2117562
Dec. 29, 2021 (GB) ..................................... 2119056
Jan. 15, 2022 (GB) ..................................... 2200492

(51) Int. Cl.
*B60R 21/0134* (2006.01)
*B62D 24/00* (2006.01)
*B62D 63/02* (2006.01)
*B60R 21/01* (2006.01)

(52) U.S. Cl.
CPC .......... *B60R 21/0134* (2013.01); *B62D 24/00* (2013.01); *B62D 63/025* (2013.01); *B60R 2021/01013* (2013.01); *B60R 2021/01252* (2013.01)

(58) Field of Classification Search
CPC ...... B60R 21/0134; B60R 2021/01013; B60R 2021/01252; B62D 24/00; B62D 63/025
See application file for complete search history.

(56) References Cited

U.S. PATENT DOCUMENTS 2,929,637 A * 3/1960 Constantine ............ B60R 21/00
180/274
2,959,446 A * 11/1960 William ............. B60N 2/42727
296/68.1
3,162,479 A * 12/1964 Hewitt ................... B62D 39/00
293/137

(Continued)

FOREIGN PATENT DOCUMENTS

CN          101104419 A       1/2008
CN          202783388 U       3/2013

(Continued)

OTHER PUBLICATIONS

Translation of WO 2012126353 (Year: 2012).*

*Primary Examiner* — Steven B Theriault

(57) ABSTRACT

A vehicle with a pod detachably secured to a planar surface chassis thereof, when in hazard escaping or transferring the pod to another platform, a control system will cause the pod to be detached from the chassis, and causing wheels to be moved out of wheel recesses which is disposed partly in the pod, so as to provide some freedom for the pod to be moved laterally, by a side impact, or to enable the pod to be moved on the chassis partly or completely out of the vehicle longitudinally. Thereafter, the control system activates a device for preventing another vehicle from intruding into the space left by the moved pod.

18 Claims, 8 Drawing Sheets

(56) References Cited

U.S. PATENT DOCUMENTS

| | | | | | |
|---|---|---|---|---|---|
| 3,423,124 | A | * | 1/1969 | Hewitt | B60N 2/42736 296/68.1 |
| 3,508,783 | A | * | 4/1970 | Schlanger | B62D 39/00 296/35.2 |
| 3,695,629 | A | * | 10/1972 | Schlanger | B60R 19/02 180/274 |
| 3,743,347 | A | * | 7/1973 | Shaw | B62D 39/00 296/68.1 |
| 3,806,184 | A | * | 4/1974 | Dean | B62D 39/00 293/133 |
| 3,820,497 | A | * | 6/1974 | Name not available | B60F 3/0007 440/12.5 |
| 3,966,220 | A | * | 6/1976 | Forsyth | B62D 31/006 280/771 |
| 3,981,520 | A | * | 9/1976 | Pulling | B60N 2/4221 180/274 |
| 5,368,121 | A | * | 11/1994 | Priefert | B62D 49/0678 280/786 |
| 5,738,378 | A | * | 4/1998 | Yazejian | B62D 39/00 180/232 |
| 6,065,556 | A | * | 5/2000 | Andrews | E02F 9/0808 180/209 |
| 6,119,882 | A | * | 9/2000 | Crook | B66F 11/046 180/906 |
| 6,158,556 | A | * | 12/2000 | Swierczewski | B60T 1/14 293/107 |
| 6,402,218 | B1 | * | 6/2002 | Kamei | B60R 22/1951 296/68.1 |
| 6,517,026 | B1 | * | 2/2003 | Smith | B64C 37/00 244/50 |
| 6,676,709 | B1 | * | 1/2004 | de la Asuncion | B62D 39/00 180/274 |
| 7,527,117 | B2 | * | 5/2009 | Strong | B62D 37/00 180/209 |
| 7,721,837 | B1 | * | 5/2010 | DeVeau | B60R 21/02 180/274 |
| 7,780,197 | B2 | * | 8/2010 | White | B60G 9/02 280/781 |
| 7,823,673 | B2 | * | 11/2010 | Asogawa | B62D 5/0418 180/238 |
| 8,746,388 | B2 | * | 6/2014 | Budweil | B60B 35/1063 180/209 |
| 9,527,536 | B1 | * | 12/2016 | Giesmann | B60K 17/30 |
| 9,636,949 | B2 | * | 5/2017 | Jong | F16H 25/20 |
| 9,988,009 | B2 | * | 6/2018 | Yang | B62D 39/00 |
| 10,545,509 | B1 | * | 1/2020 | Jessen | G05D 1/0291 |
| 10,611,412 | B1 | * | 4/2020 | Attia | B62D 21/15 |
| 11,046,143 | B1 | * | 6/2021 | Aikin | B60G 17/0195 |
| 2001/0026079 | A1 | * | 10/2001 | Laurent | B62D 39/00 296/187.09 |
| 2003/0025342 | A1 | * | 2/2003 | Belloso | B62D 39/00 293/107 |
| 2004/0245033 | A1 | * | 12/2004 | Saeki | B62D 39/00 180/89.1 |
| 2005/0027421 | A1 | * | 2/2005 | Humpal | B60B 35/1036 701/50 |
| 2005/0080530 | A1 | * | 4/2005 | Arduc | B60R 21/013 701/37 |
| 2005/0275181 | A1 | * | 12/2005 | MacIsaac | B62D 39/00 180/271 |
| 2006/0208463 | A1 | * | 9/2006 | Neal | B60G 5/02 280/677 |
| 2006/0254841 | A1 | * | 11/2006 | Strong | B62D 55/02 180/9.5 |
| 2007/0035148 | A1 | * | 2/2007 | Ellenrieder | B62D 21/15 296/35.1 |
| 2007/0071548 | A1 | * | 3/2007 | Arrieta-Eskarzaga | E01C 1/002 404/1 |
| 2007/0164583 | A1 | * | 7/2007 | Jong | B62D 39/00 296/187.03 |
| 2009/0320713 | A1 | * | 12/2009 | Amiri | E01B 25/28 280/1 |
| 2011/0301812 | A1 | * | 12/2011 | Pizzagalli | B60W 30/085 701/37 |
| 2012/0181100 | A1 | * | 7/2012 | Halliday | F41H 1/02 89/930 |
| 2013/0319310 | A1 | * | 12/2013 | Harbin | B63B 1/322 114/71 |
| 2014/0260158 | A1 | * | 9/2014 | Nelson | B60B 35/1054 56/16.7 |
| 2014/0327221 | A1 | * | 11/2014 | Berry | B60B 35/10 280/124.128 |
| 2015/0102568 | A1 | * | 4/2015 | Slawson | B60G 17/00 280/5.514 |
| 2017/0080751 | A1 | * | 3/2017 | Jong | F16C 3/03 |
| 2017/0137023 | A1 | * | 5/2017 | Anderson | B60W 10/22 |
| 2017/0225724 | A1 | * | 8/2017 | Andersen | B62D 39/00 |
| 2017/0347518 | A1 | * | 12/2017 | Brooks | B60N 2/003 |
| 2018/0050712 | A1 | * | 2/2018 | Mitchell | B60R 9/06 |
| 2018/0133074 | A1 | * | 5/2018 | Delise | B62D 33/02 |
| 2019/0023071 | A1 | * | 1/2019 | Moen | B60B 35/1054 |
| 2019/0047481 | A1 | * | 2/2019 | Eppright | B62D 33/0636 |
| 2021/0221438 | A1 | * | 7/2021 | Ohno | B62D 65/00 |
| 2021/0241404 | A1 | * | 8/2021 | Laughlin | G16H 40/67 |
| 2023/0365088 | A1 | * | 11/2023 | Maung | B62D 24/04 |
| 2024/0158015 | A1 | * | 5/2024 | Lee | B62D 24/00 |

FOREIGN PATENT DOCUMENTS

| | | | | |
|---|---|---|---|---|
| CN | 103410934 A | | 11/2013 | |
| CN | 203450075 U | | 2/2014 | |
| CN | 205971195 | * | 2/2017 | B60R 21/02 |
| CN | 111065552 A | | 4/2020 | |
| CN | 111422156 A | | 7/2020 | |
| DE | 19817992 | * | 12/1999 | B60R 21/02 |
| DE | 19817992 A1 | | 12/1999 | |
| EP | 1016563 | * | 7/2000 | B60N 2/4221 |
| WO | WO 2012126353 | * | 9/2012 | B60W 10/22 |
| WO | WO2020039270 | * | 2/2020 | B62D 21/15 |
| WO | WO2020176415 | * | 9/2020 | B64D 1/10 |

* cited by examiner

MECHANISMS FOR MOVING A POD OUT OF A VEHICLE

CROSS-REFERENCE TO RELATED APPLICATIONS

This application is a continuation-in-part of U.S. patent application Ser. No. 17/426,102, filed on Jul. 28, 2021, which is derived from PCT International application PCT/IB2020/061837, filed on Dec. 11, 2020.

This application is related to U.S. patent application Ser. No. 15/929,449, filed on May 4, 2020, now U.S. Pat. No. 11,254,272 B2, on the grounds that they contain common subject matter.

This application is also related to and claims priority to another PCT International application PCT/IB2021/051670 filed on Mar. 1, 2021, on the grounds that they contain common subject matter.

This application is also related to a UK patent application GB 2007051.2 filed on May 13, 2020 and a China patent application 202010359207.3, filed on Apr. 29, 2020, on the grounds that they contain common subject matter. Actually the UK application shares the same English specification with the U.S. application Ser. No. 15/929,449, whereas the China application is a China translation of the English specification. Both PCT International application PCT/IB2020/061837 and PCT/IB2021/051670 claim priority to both the China and US patent applications.

All the related patent applications, as well as the patent applications from which this application claim priority benefit, their entire contents are incorporated herein by reference (herein below they are collectively referred as "patent applications").

STATEMENT REGARDING FEDERALLY SPONSORED RESEARCH OR DEVELOPMENT

Not Applicable THE NAMES OF THE PARTIES TO A JOINT RESEARCH AGREEMENT

Not Applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a vehicle with a separable pod, and particularly, to enable the pod to be moved into or out of the vehicle, when in a collision, or in a pod transfer for transferring a pod between two platforms, which may be two different vehicles.

2. Description of Related Art of the Invention

Conventionally, passengers in a vehicle are protected by airbags in a collision, however, serious injuries are still unavoidable.

And, in the recent years, vehicles with their individual chassis separable from a pod (alternatively called as a cabin) therein are proposed by different automobile manufacturers.

U.S. Pat. No. 8,041,483 and China utility model patent CN205971195U disclose using airbags to protect a vehicle and a cabin separated from a chassis, respectively, and their manner of protection is depending on the severity of an anticipated impact. The latter patent, in particular, discloses ejecting the cabin out of the vehicle.

SUMMARY OF THE INVENTION

It is therefore an object of the present invention to provide moving mechanisms, for moving a pod into or out a chassis of a vehicle, in a hazard, or in a pod transfer.

According to the first and second embodiments, the pod and the chassis is connected by a cable, for preventing the pod from jumping up or even out of the chassis, caused directly or indirectly by a collision impact, and the cable can also be used for moving the pod into or out of the chassis.

According to the sixth embodiment and referring to FIGS. 2, 8 and 9, pod 6 has at least one separable tubular element 38, lying laterally on the chassis, with two wheel recesses 9 at its two ends for enclosing two (front or rear) wheels of the vehicle. By separating pod 6 from tubular element 38, pod 6 can be moved laterally out of chassis 10, and not be hindered by the wheels.

According to the seventh embodiment, the pod can be moved longitudinally, together with tubular element 38 therein, and not be hindered by the wheels, by moving the wheels out of the wheel recesses 9.

Figure 1:
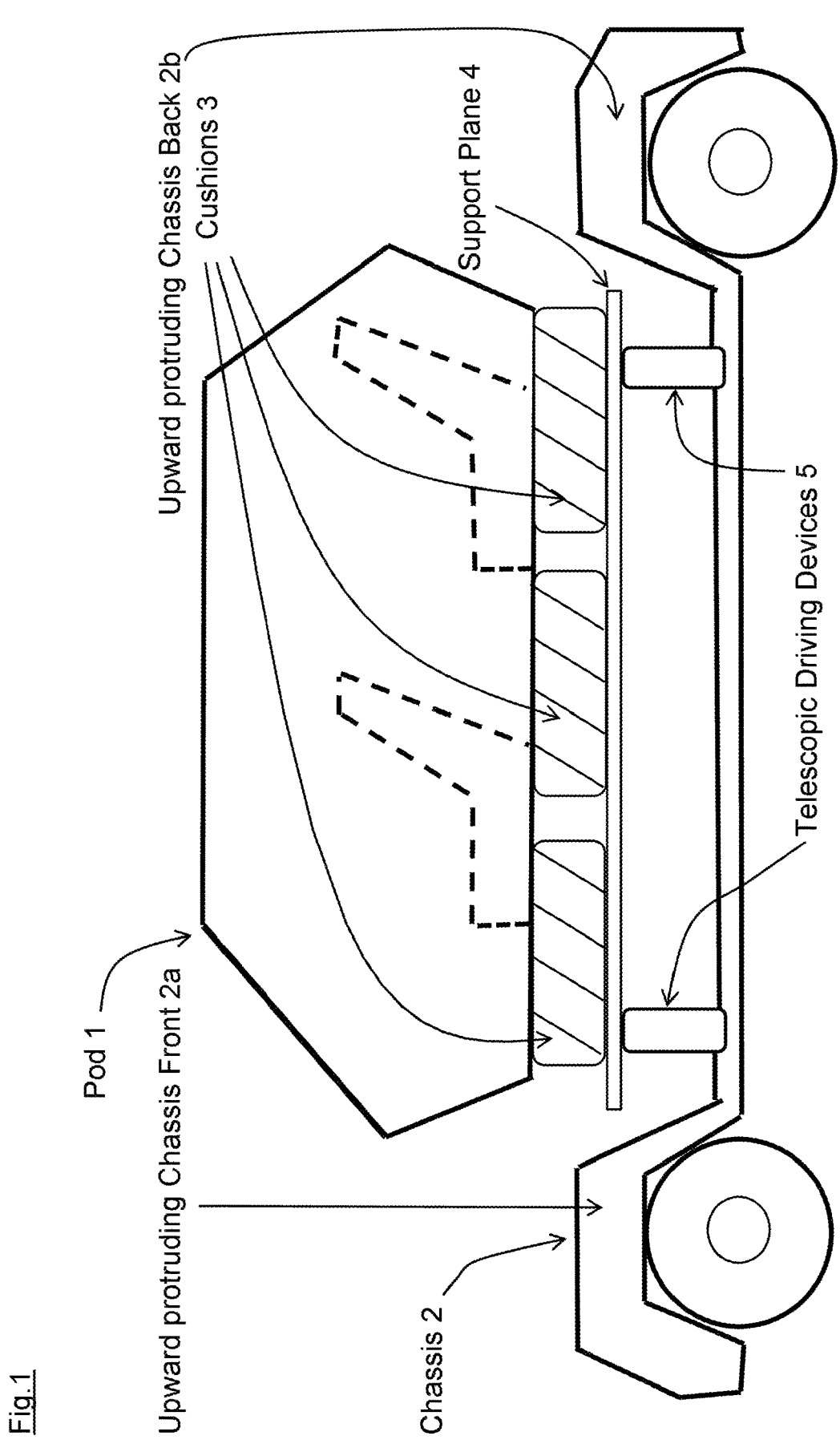
FIG. 1 is a schematic diagram of an exemplified vehicle with a pod separable from a chassis therein.

Note that the above figures may not be in proportional, and for instance, in FIG. 1 the gaps between different parts therein, for instance, the pod and the chassis, are greatly exaggerated to avoid confusion, and in real practice, such gaps may exist but should be negligible.

DETAILED DESCRIPTION OF THE INVENTION

Figure 2:
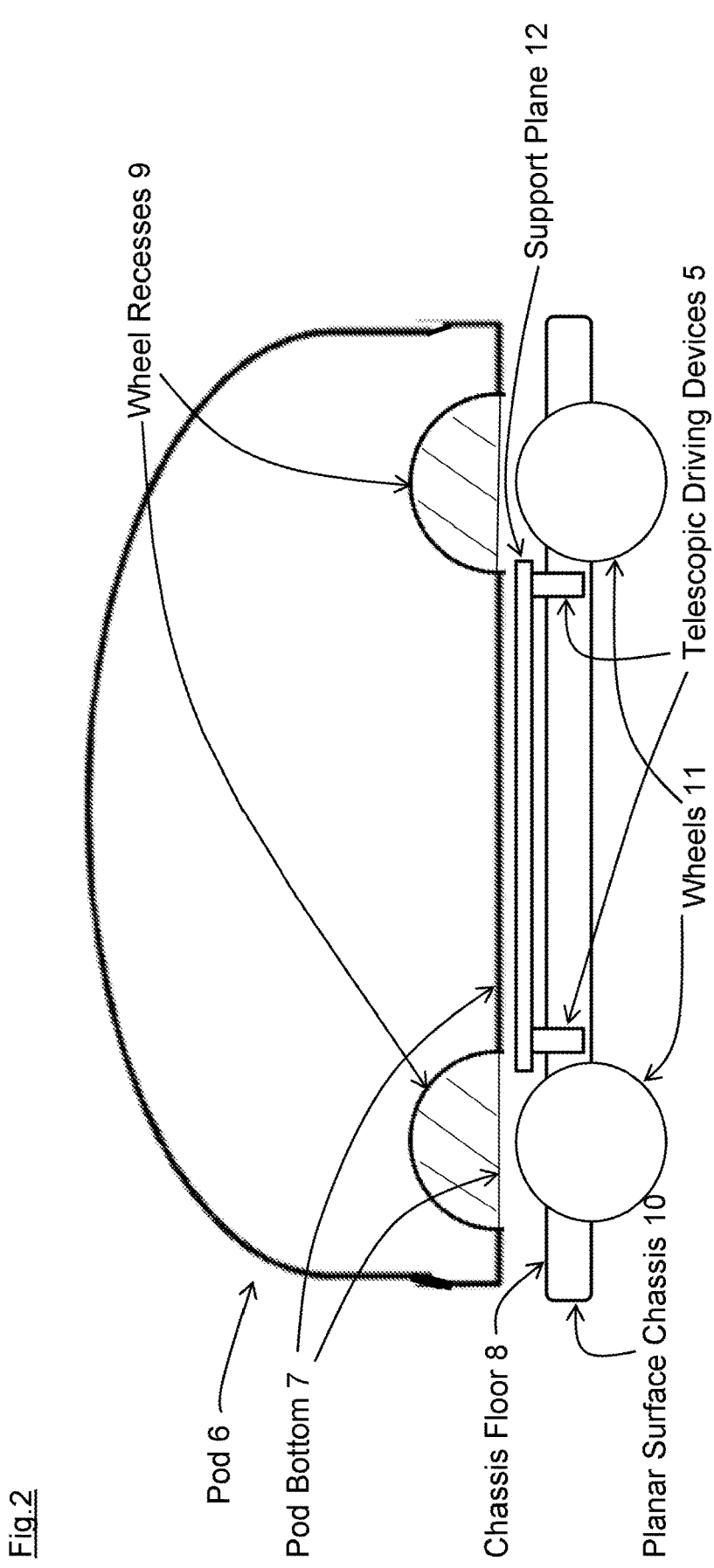
FIG. 2 is a schematic diagram of an exemplified vehicle with a planar surface chassis, and a pod separable from a chassis therein.

According to the present invention and referring to FIGS. 1 and 2 the present vehicle may be capable of autonomous driving, or driven by a human inside or remotely, and a pod which is detachably secured to a chassis 2 or 10 directly or indirectly, may be used for carrying goods, and/or humans.

In the present vehicle, all operable units (as mentioned in this document) are under the control of a control system, it processes signals received from the operable units, for example, using artificial intelligence to identify external objects as humans, vehicles from signals from radars, cameras, etc., and then, making decisions as to what operations should be performed, and finally, causing the operations to be performed by the operable units.

The control system uses conventional detectors (including those as disclosed in the "patent applications", such as shock/impact sensor) to detect a hazard which may be a collision, an imminent collision, a potential fire risk or a fire takes place on the chassis, and basing on signals received from the detectors, the control system knows there is a hazard and may be able to determine the severity of the hazard.

If a hazard, or a severe hazard, is detected, or in a pod transfer, the control system causes an attachment and detachment device to detach the pod from the chassis, to allow relative movement between the pod and the chassis, and then cause the pod to be moved, out of the chassis (or support plane 4 or 12, if any) horizontally, refer to FIG. 1 or 2.

The control system may be any conventional computing system comprising at least one processing units, and may be installed in the chassis or the pod, or partly in the chassis and partly in the pod, or partly or completely cloud based.

Figure 3:
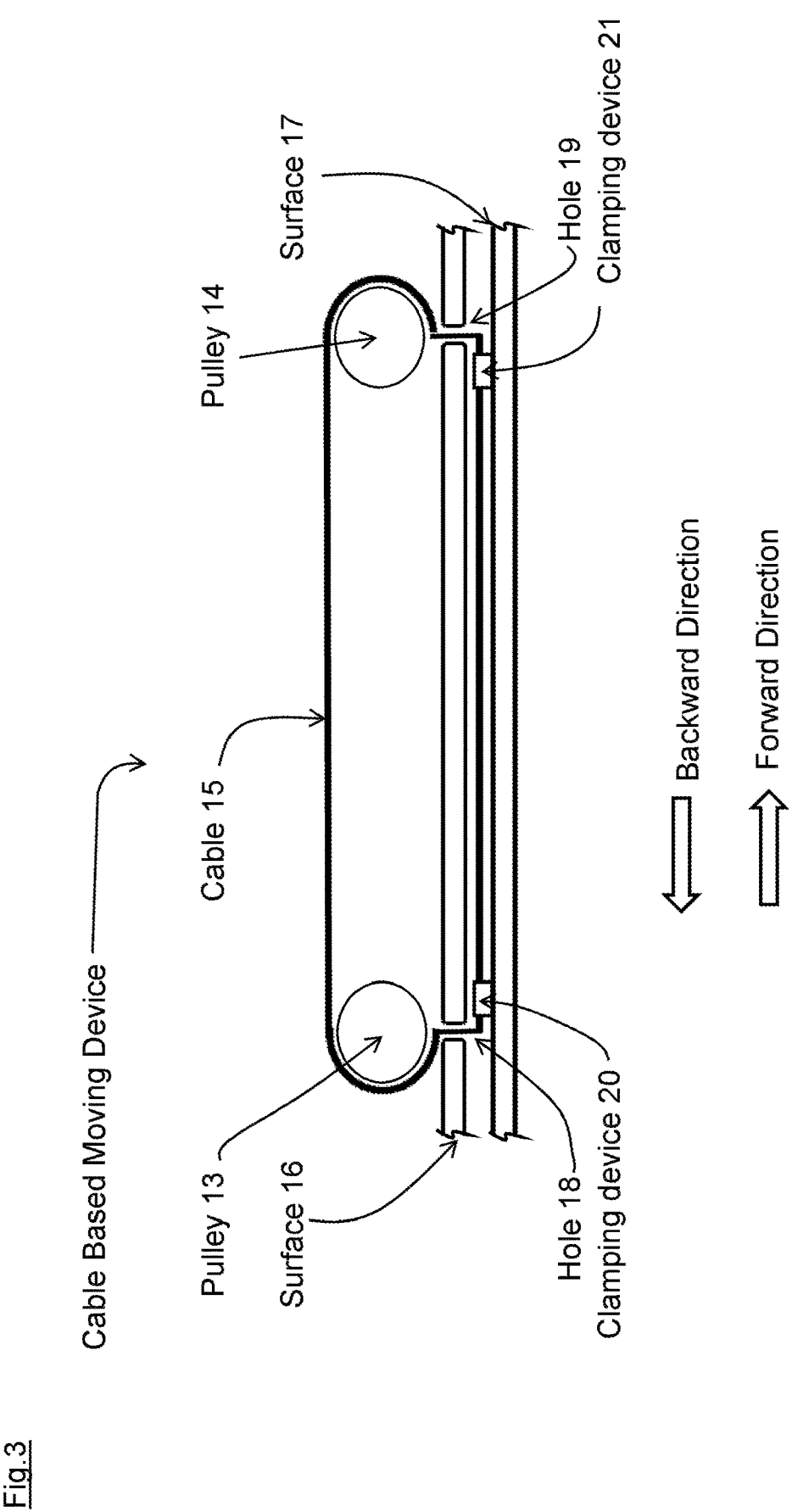
FIG. 3 is a schematic diagram of an exemplified cable-based moving device according to the first embodiment.

According to the first embodiment and referring to FIG. 3, there is shown a cable-based moving device. The pulleys 13, 14 are for moving cable 15 bidirectionally, either by a same rotor or two different motors respectively.

Cable 15 may be any conventional continuous loop such as a continuous track or belt, whereas clamping devices 20, 21 represents any conventional devices capable of detachably securing itself to such a loop.

When in operation, clamping devices 20, 21, which are at a positon on surface 17, clamps the part of cable 15 which being exposed on surface 16, and by using motor-driven pulleys 13, 14 to move cable 15, the control system can cause surface 16 to move in relative to surface 17, And, when a clamping device 20 or 21 comes closely to hole 18 or 19, as surface 16 is caused to move in relative to surface 17, in backward or forward direction, the control system causes the clamping device to release cable 15, to allow the part of cable 15 which being previously clamped, to be moved into hole 18 or 19.

And in order to do this, the control system has to determine the distance between the clamping device and the hole, by conventional techniques, basing on the relative position between the two surfaces 16, 17, and the position of the clamping device on surface 17, and the position of the hole on surface 16.

The control system may determine the relative position between the two surfaces 16, 17, by using a laser distance sensor to detect the distance of a reference point on one surface to another reference point on another surface, or by using Global Positioning System (GPS) devices for providing GPS positions of the two reference points.

Note that one of surfaces 16, 17 may be the lower surface of the pod, and the other one will be the upper surface of the chassis floor (or support plane 4, 12, if exists).

Figure 4:
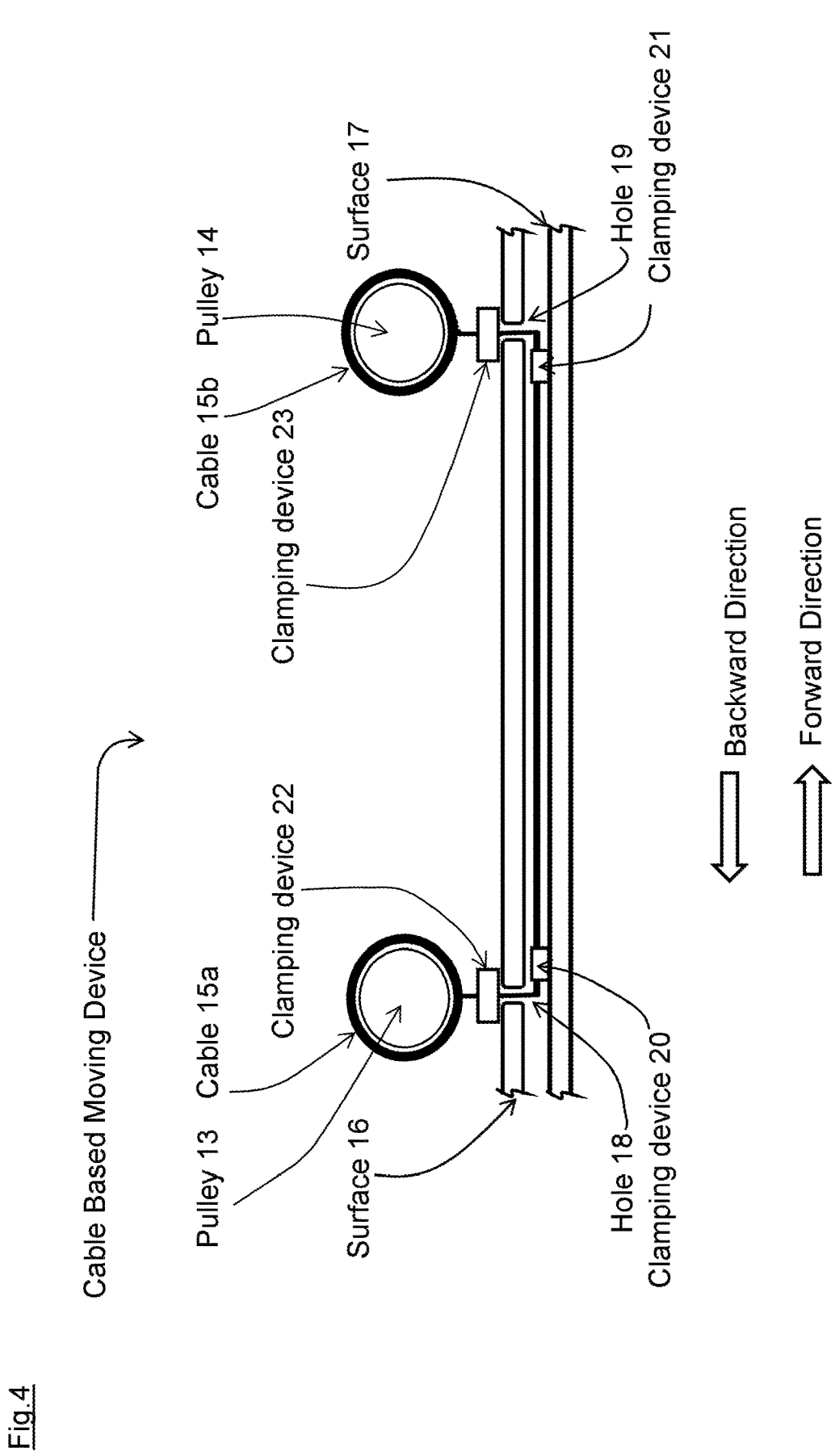
FIG. 4 is a schematic diagram of an exemplified cable-based moving device according to the second embodiment.

According to a second embodiment which is a modification of the first embodiment, and referring to FIG. 4, cable 15 may alternatively be understood as comprising of two inseparable parts, that is, cable 15*a* and 15*b*, and they coil around pulleys 13 and 14 respectively, so that when the two motor-driven pulleys 13, 14 rotate in a same direction, which may be, clockwise or anti-clockwise, the cable will be uncoiled from one pulley and coiling up by the other pulley.

There are clamping devices 22, 23 behind (or may alternatively be in front of) hole 18 or 19 of surface 16, respectively, located at fixed positions of surface 16.

It may or may not be desirable to let the pod be moved out of the chassis, by a collision impact, dependent on the movement may or may not lead to more undesirable consequence, such as a secondary collision. Therefore, the control system may allow the movement to happen by not activating clamping devices 22, 23, or prevent the movement by activating clamping devices 22, 23 to clamp cable 15*a* and cable 15*b* tightly.

Desirably, the control system is capable of adjusting the clamping forces of clamping devices 22, 23 used to clamp cable 15*a* and cable 15*b* respectively, such that if the external impact is a minor one, it will not cause any relative movement between the pod and the chassis, and if the external impact is severe or exceeds a certain limit, the relative movement can take place, so as to allow the pod to be moved away from the impact. Each of clamping devices 22, 23 is formed of two clamp halves, and when in a closed position, the two clamp halves together form a hole to enclose cable 15 inside, to prevent cable 15 from getting out, but may allow cable 15 to slide therethrough, to enable the relative movement.

Pls. note that clamping devices 22, 23 may also be applied or adapted to the first embodiment, for allowing or preventing movement of cable 15, in the above-mentioned manner.

As an alternative to clamping devices 22, 23, techniques used in conventional braking mechanisms for stopping or slowing down a road-running wheel of a vehicle, may be adapted to apply a variable braking force to pulley 13, 14 (of the first or second embodiments), under the control of the control system, so that cable 15, or cables 15*a* and 15*b* cannot be moved at all, or can only be moved if an external impact is greater than a predetermined limit.

Figure 5:
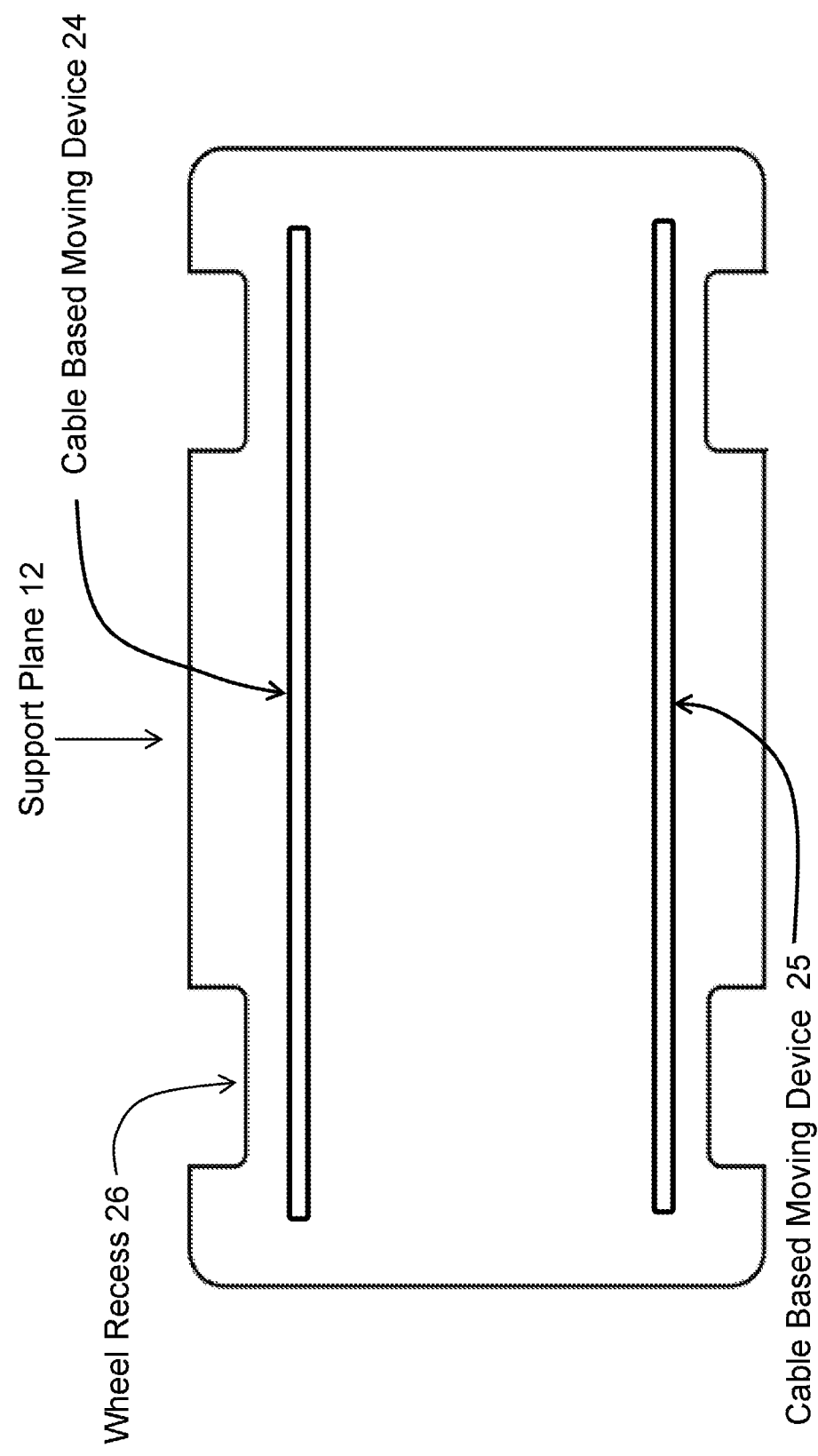
FIG. 5 is a schematic top view of support plane 12, with two cable-based moving devices on its surface.

Referring to FIG. 5, two longitudinal cable-based moving devices 24, 25, which may pertain to the first or second embodiment, are disposed on support plane 12, for moving a pod thereon longitudinally.

Note that such a cable-based moving devices may also be used foremoving a pod laterally, on any surface, such as a chassis.

As an improvement, each of the clamping devices 20, 21 is itself movable on surface 17 and may be moved laterally or longitudinally on a respective or the same rail (or groove, not shown in the FIG. 3 or 4), disposed on surface 17, and the clamping devices 20, 21 each may have at least one electric motor driven wheel engaging with the rail (or groove) for moving itself, under control of the control system, so that if there is any lateral or longitudinal misalignment of surfaces 16 and 17, the clamping device can be moved, on its rail, laterally or longitudinally to compensate the misalignment and to clamp a corresponding longitudinally or laterally laid cable 15, 15*a* or 15*b*, respectively.

Note that the misalignment of surfaces 16 and 17 is actually the relative position between the two surfaces, and determination methods therefor are disclosed above, and thereby, the control system can cause the compensation to be performed. Such misalignment is inevitable when a pod is transferred from another platform onto the chassis.

To facilitating the clamping, cables 15*a* or 15*b* preferably has to be placed under tension, caused by rotating both pulleys 13, 14 in a respective direction for coiling cable, and then held tightly by the clamping actions of immovable clamping devices 22, 23.

After successfully clamping cable 15, 15a or 15b, clamping devices 20, 21 may also be moved laterally/longitudinally on their respective rail in the same manner, so as to cause laterally/longitudinally movement of surface 17 in relative to surface 16, provided that cable 15, or both 15a, 15b are still being held tight.

As a further improvement, the lateral (or alternatively longitudinal) rail is movable longitudinally (or alternatively, laterally). Specifically, each of the two ends of the movable rail is attached to a respective moving device with at least one electric motor driven wheel engaging with and for moving on a fixed rail, under control of the control system. The two moving devices, under control of the control system, can move in a co-operative manner so as to move the movable rail longitudinally (or laterally), and thus moving the corresponding movable clamping devices 20, 21 disposed on the movable rail.

In this way, the control system can cause clamping devices 20, 21 to move in all directions on surface 17, and thereby, causing a corresponding relative movement between surfaces 16, 17, when the clamping devices 20, 21 are clamping cable 15, or 15a, 15b, and when the cable is held tightly, by the method as mentioned above.

Figure 6:
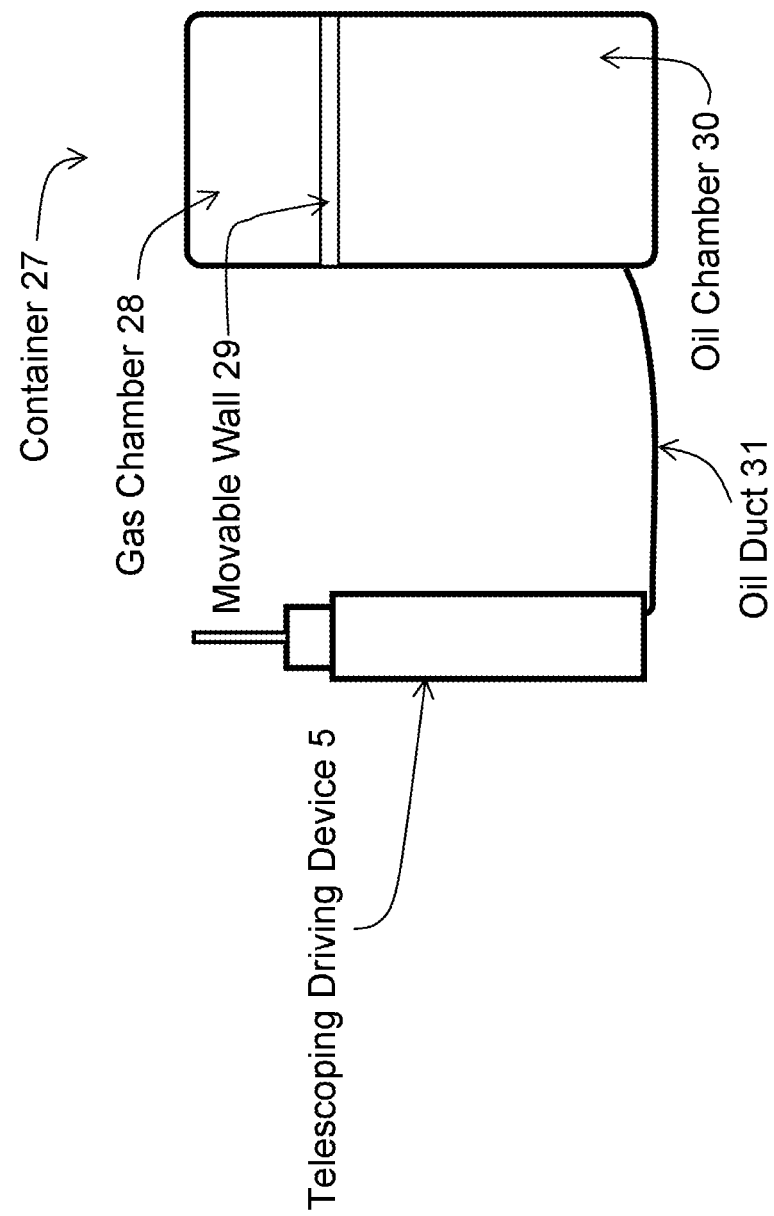
FIG. 6 is a schematic diagram of a pressurized oil supply system for telescopic driving devices S.

According to a third embodiment and referring to FIG. 6, there is provided a pressurized fluid supply system, it has a container 27, in which there are a upper gas chamber 28 and a lower oil chamber 30, and the two chambers are separated by a movable wall 29.

And, a pyrotechnic device, under control of the control system, is used for generating pressurized gas, by burning pyrotechnic material, in gas chamber 28, to push the movable wall 29 downward, and thereby, push the oil in oil chamber 30 to be delivered to telescoping driving device 5, through oil duct 31. Note that the movable wall 29 may not be necessary and can be saved, if the oil cannot absorb the pressurized gas.

Although not shown in FIG. 6, a valve is disposed in oil duct 31 and can be activated or deactivated, by the control system, for supplying oil to telescoping driving device 5, or stopping further oil supply, after telescoping driving device 5 has made the required extension, respectively.

The extension being made can be detected by the control system using conventional techniques such as laser distance sensors. In practice, such a sensor may be used for determining the height of support plane 4 (or 12), relative to the chassis, as support plane 4 (or 12) is raised by telescoping driving device 5.

Although not shown in FIG. 6, a vent, under control of the control system, is disposed in the gas chamber 28, to release the pressurized gas to the atmosphere.

In this way, the height of support plane 4 (or 12) as well as the pod laid thereon, can be raised in a short time.

Note that other conventional techniques such as a container storing pressurized air/gas may be used as a pressurized gas source, instead of the pyrotechnic device.

According to a fourth embodiment, the present vehicle has a chassis 10, with a planar or substantially planar surface, refer to FIG. 2, or a modified chassis 10 like the one as described in the sixth embodiment.

A suspension system is disposed between the road-running wheels and the chassis, used for raising up the chassis (herein the term "chassis" should be understood as excluding the suspension system, and the wheels), and also a pod resting on the planar surface of the chassis/modified chassis 10, to such an extent that the pod can be raised up above the road-running wheels (and other upward protruding parts which does not move up with the chassis and pod, if any), for enabling horizontal movement of the pod, in a pod transfer or hazard escaping.

In this case, support plane 4 or 12 is not necessary for enabling the pod movement.

And, the techniques disclosed above for extending telescoping driving device 5, as well as other similar conventional skills in the art, can be applied to or adapted to the suspension system, or added in parallel or in series with an existing conventional suspension system, for raising up the pod for pod movement.

In the above/below disclosure, after raising up the pod, the center of gravity of the vehicle will also be raised up and may be dangerous, especially when the vehicle is moving and turning around, says, a corner, and in order for lowering the risk of overturning of the vehicle, the control system may cause the vehicle be tilted laterally, and tilted toward the center of the circular path or circular arc path the vehicle is travelling, by causing the telescoping driving devices 5 for raising up support plane 4, 12 and/or suspension systems at the two sides of the vehicle be extended differently, so as to counter the centrifugal force so generated.

Figure 7:
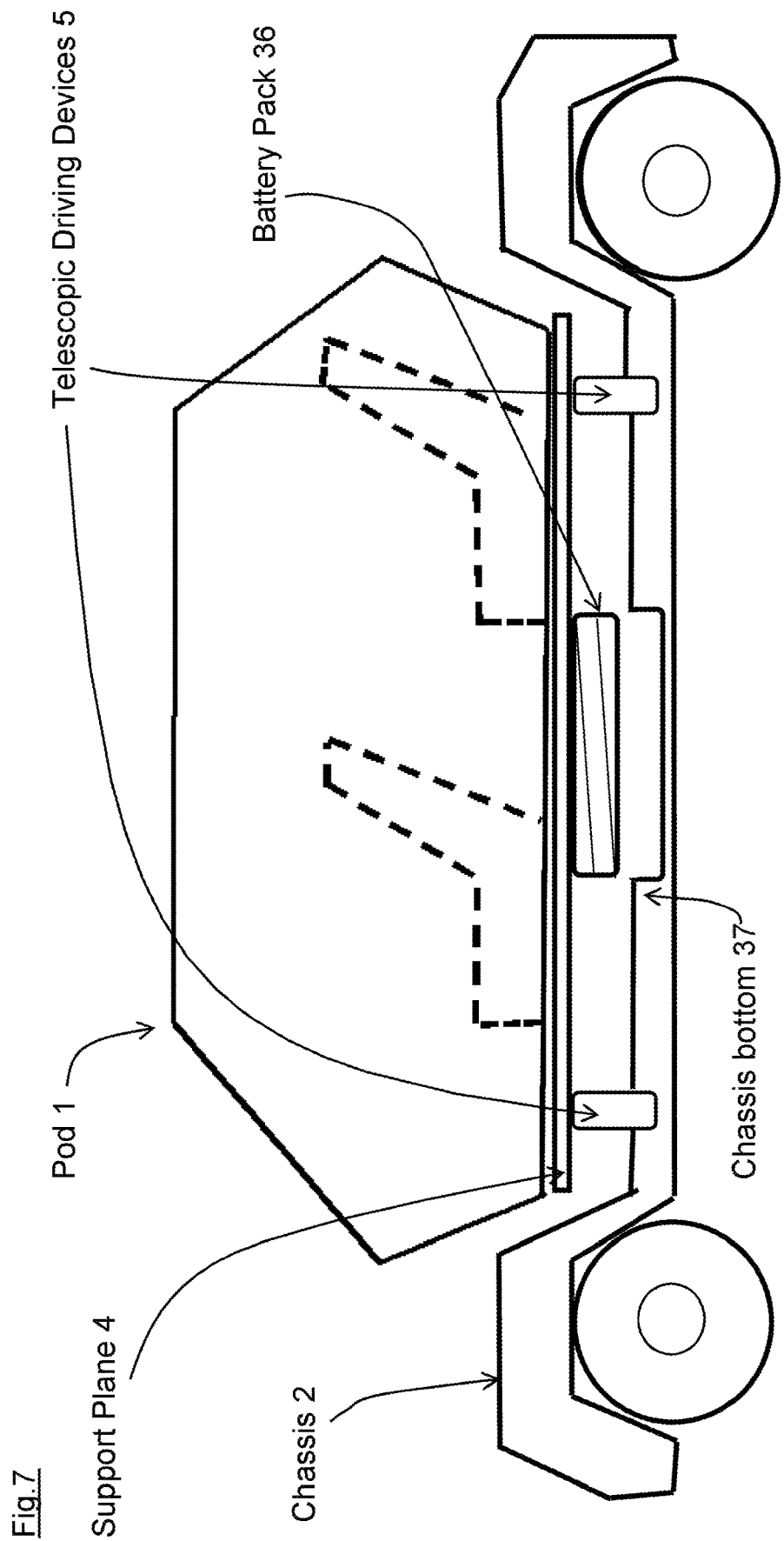
FIG. 7 is a schematic diagram of a present vehicle with a battery pack 36 raised up from the chassis bottom 37, by a support plane 4.

According to the fifth embodiment, the present vehicle has a battery pack 36, it, may be partly or wholly embedded in the chassis bottom 37 for space saving, refer to FIG. 7.

And, the control system has a detector (not shown in FIG. 7), which may be a LIDAR, a camera and/or a shock sensor for detecting if the chassis bottom 37 is/will be hit by an obstacle, says, obstacle A, below it, which may be a rock on a road on which the present vehicle is running, or for detecting if the vehicle will come to a pothole.

On the other hand, if the present vehicle, or at least a wheel of the vehicle falls into a pothole, then even a small obstacle, says, obstacle B, may hit the chassis bottom 37, and therefore, a free fall detector (any conventional free fall detection device, such as those disclosed in U.S. Pat. No. 9,076,471 which is incorporated herein by reference, as illustrative, non-limiting examples only.) should be disposed in the vehicle, and desirably, in every wheel of the vehicle, to detect such a fall.

If such an obstacle, or such a fall is detected, the control system causes the support plane to be raised up, and thereby, raising up battery pack 36 which is detachably secured to support plane (may be the lower surface thereof), to a height which would prevent or at least reduce the damage on battery pack 36, refer to FIG. 7. Note that the vehicle may be tilted when only one or two wheels fall into the pothole, and the support plane may be raised, with compensation tilting such that it is maintained horizontal, by using a digital spirit level to detect any tilting of support plane 4 and thereby, the control system determines by the amount of compensation tilting needed to counter it.

The control system determines the height according to the size and/or height of the obstacle A detected, if such information is available from the detector.

After the present vehicle has passed over obstacle A or the pothole, the control system causes the support plane to be lowered to chassis floor level.

Desirably, the pod is detachably secured to the chassis indirectly, that is, detachably secured to the support plane, throughout the process.

According to the sixth embodiment which is directed to vehicle with a planar or substantial planar surface chassis 10, and referring to FIG. 2, it provides a side view of such a vehicle having 4 wheels, that is, 2 front and 2 rear wheels.

Figure 8:
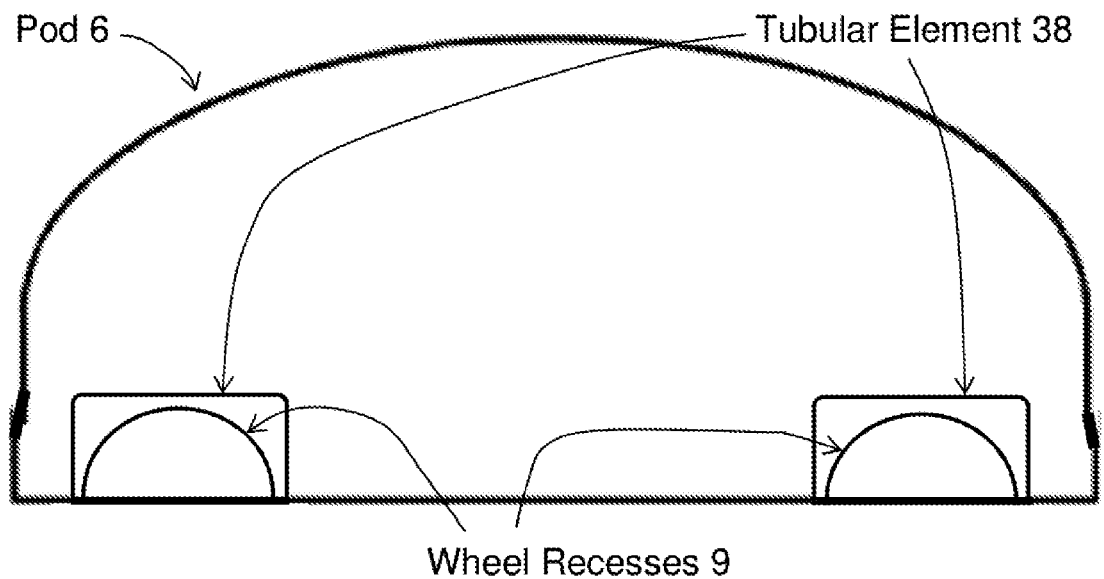
FIG. 8 is a schematic view of pod 6, with two tubular elements 38.
Figure 9:
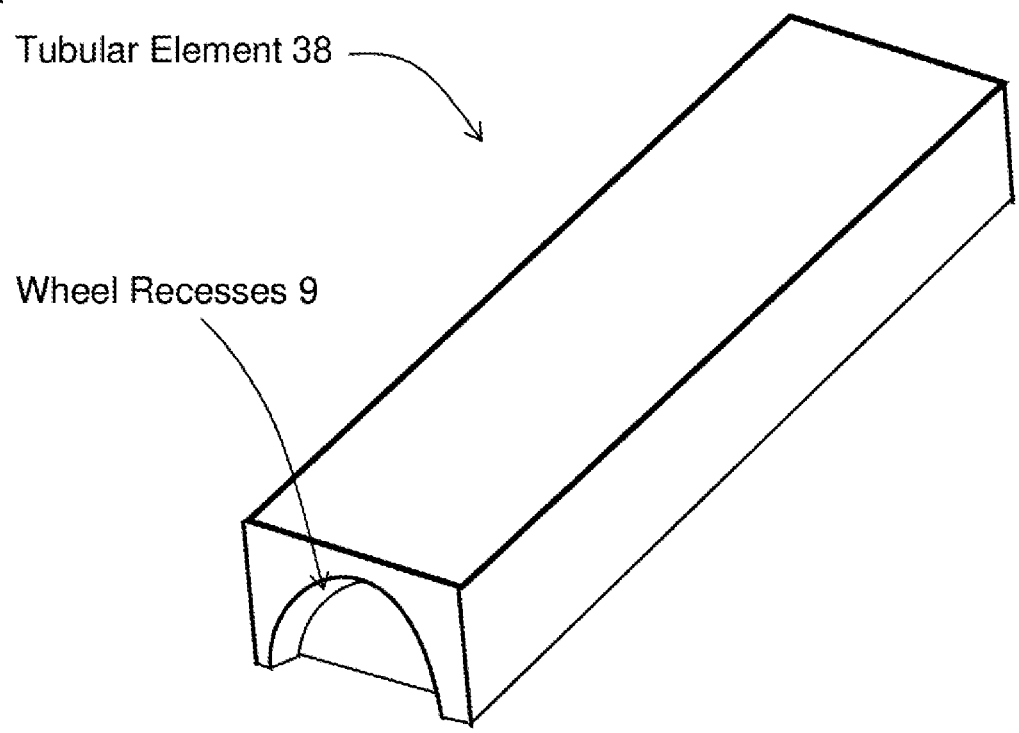
FIG. 9 is a 3D schematic view of a tubular elements 38.

Referring to FIGS. 8 and 9, pod 6 has 2 tubular elements 38, each tubular element 38 lies laterally on the planar surface of chassis 10, with two wheel recesses 9 at its two ends, for accommodating two (front or rear) wheels of the vehicle.

The tubular element 3 may be of any uniform cross-section, as long as its two ends are large enough to provide a respective wheel recess 9 for receiving a wheel therein, and may be of any shape such as trapezium, semi circle, etc., and therefore is not restricted to the rectangular shape as shown in FIG. 9.

And, each tubular element 38 has an internal cavity and may be used to store anything including battery packs, and is detachably secured to pod 6 and/or chassis 10, by an electromechanical locking and unlocking device under control of the control system.

In order for pod 6 to be moved laterally with respect to the chassis, for to be transferred to another platform in a pod transfer or hazard escaping, tubular elements 38 have to be detached from pod 6, if they are attached to pod 6, and electrical connections between pod 6 and tubular elements 38, if exists, will also have to be disconnected by the electromechanical locking and unlocking device.

Thereby, lateral movement of pod 6 will not be impeded by the wheels. As a modification, pod 6 is shorter than the one as shown in FIGS. 2 and 8, and it may be about half the length of chassis 10, and the modified pod 6 can only have two (front or rear) wheels below it.

The chassis 10 may also be modified in such a way that, only a part of it where the modified pod 6 rests on, has a planar or substantial planar surface, and the other part may be upward protruding. As examples, referring to FIG. 1, the chassis front 2a and chassis back 2b of chassis 2 are upward protruding parts.

Finally, there is only one tubular element 38 inside modified pod 6, and lateral movement of modified pod 6, in relative to modified chassis 10, can be performed in just the same manner as above-mentioned.

According to the seventh embodiment, the wheels of the present vehicle are each directly or indirectly attached to an end of a telescopic shaft, which can be extended laterally and telescopically by the above disclosed techniques used in telescoping driving device 5, or any conventional mechanical, hydraulic or pressurized fluid device(s), under control of the control system, for pushing the attached wheels, with or without other related/associated parts, out of a wheel recesses 9 of tubular elements 38, so as to allow pod 6, with tubular elements 38 inside, be moved longitudinally with respect to chassis 10, unhindered by the wheels, in a pod transfer or hazard escaping.

In order to do so, tubular elements 38 have to be detached or disconnected from chassis 10, if they are attached to or connected with chassis 10 physically and/or electrically, in the manner same as that for disconnecting pod 6 and tubular elements 38, as mentioned above.

Those "other related/associated parts", may be a motor for driving such a wheel, or a steering device for changing the driving direction of such a wheel, or a part thereof; or a protective structure, such as a shield for enclosing or protecting a part of such a wheel.

And, conventional telescopic techniques for varying spacing between two (front or rear) wheels, may be used or applied herein, including those as disclosed in U.S. Pat. Nos. 6,199,769 and 9,527,536, as well as China patent application 201911055763.5, and the three documents are incorporated herein by reference, as illustrative, non-limiting examples only.

As an alternative, tubular element 38 is an inseparable part of pod 6, and if so, the wheels at the side of the present vehicle not facing a side impact, may be moved laterally in the above-mentioned manner, in order to provide some freedom to pod 6 for to be moved laterally relative to the chassis, away from the impact, by the moving mechanisms disclosed herein or in the "patent applications", or other conventional moving mechanism, and/or by the external side impact.

The control system may also cause this to be performed as a remedy, when pod 6 which should be separable from tubular element 38, fails to do so, owing to a malfunction of an electromechanical device for attaching and detaching tubular element 38 to/from pod 6, which can be detected by a conventional detector under control of the control system for detecting operation of the detaching action of the device, such as infra-red (IR) emitter and sensor for detecting if a locking pin of the device, used for locking the pod with tubular element 38, is at an locking position, and if it is, it will block the IR communications between the emitter and sensor.

The control system may cause a wheel to be moved out of the wheel recess 9, after it determines this movement will not cause an impact risk to external objects such as humans, vehicles, by the above-mentioned detection and identifying techniques.

Basing on the determination of the impact risk, the wheels at both sides of the vehicle, may be moved to different distances laterally, in order for allowing longitudinal movement of pod 6 in relative to chassis 10.

If so, the control system has to cause pod 6 (with tubular elements 38 inside) to move laterally towards the more outwardly moved wheels at one side of the vehicle, so as for moving pod 6, together with the wheel recesses 9 of tubular element 38, away from the wheels at the other side of the vehicle, which is less outwardly moved, or not being moved at all. And the result should be, all wheels of both sides are out of their respective wheel recess 9.

Note that for the above-mentioned modified pod 6, if it rests on a modified chassis 10 with a front upward protruding part, then only the rear wheels have to be out of their respective wheel recess 9, in order for allowing backward movement of the modified pod.

By the way, in case there is an imminent frontal collision, it will be desirable to move the modified pod 6 backward in the modified chassis 10 for a distance, by the moving mechanisms disclosed herein or in the "patent applications", or other conventional moving mechanism, so that when the collision really happens, and the present vehicle is forced to stop instantaneously, the modified pod 6 will have the distance for a gradual deceleration, before it crashes with the front upward protruding part.

Further, when the modified pod 6 starts the deceleration, and by using a conventional acceleration or shock detector (such as MEMS type) to detect the deceleration, the control system causes the moving mechanism to apply a driving force, to drive the modified pod 6 in backward direction, or cause clamping devices 22, 23 to apply a clamping force to cable 15 in the above-mentioned manner, to prevent modified pod 6 from moving unless the force driving it exceeds a certain limit, then the momentum of the backward movement of the modified pod 6 can be reduced, and be less harmful to humans inside.

Alternatively, the impact risk may be determined basing on a presumption that no external objects would exist in a position, or very close to a position where the present vehicle which is in continuous motion, is going to occupy, or has just left, and accordingly, the control system determines the positions where the present vehicle has been, in a most recent time period, says, 1/20 of a second, and also determines the positions where the present vehicle will be in, in a coming time period, says, 1/20 of a second.

And if it is determined that the moved wheel will be within, or within a short distance (says, 1/3 meter) from, those positions of the vehicles, then the wheel can be moved.

Note that the above-mentioned time periods and distance may also be dependent on the potential risks detected or determined, as will be discussed herein below, and if the potential risk(s) is/are low, then the time periods and/or the distance can be longer, and/or the wheel can be moved out of wheel recess 9 at a higher speed.

Further, the distance can be longer, when the present vehicle is moving in a high speed than when it is moving in a low speed, under the presumption that an external object would tend to stay away from a high speed vehicle, for the sake of its own safety.

This innovative technique may also be used for extending external impact absorbing/resisting devices, and devices for preventing intrusion by another vehicle into the present vehicle when it is not carrying a pod, out of the present vehicle.

According to the eight embodiment, the control system may be basing on potential risks of the present vehicle, such as its speed, traffic conditions (for eg., whether there is high speed moving vehicles nearby), weather conditions, road conditions, vehicle conditions, vehicle component conditions, visibility on the road; to cause the wheels to be moved completely out of wheel recesses 9, so as to permit longitudinal movement of pod 6 with respect to the chassis 10, as a proactive measure against potential severe damages and losses, if a frontal collision suddenly happens.

As an alternative, the wheels may be moved partly out of wheel recesses 8, so that it may take less time to move them completely out of wheel recesses 8, or the wheels are moved completely out of wheel recesses 8, when a collision or imminent collision is detected by the above mentioned hazard detectors.

And, if the potential risk becomes less serious, or no longer exists, for e.g., there is no high speed moving vehicles nearby, the control system will cause the wheels to move partly or completely back into wheel recesses 9.

To achieve these, the control system is capable of detecting and determining the above-mentioned potential risks, by use of conventional techniques and sensors. And, U.S. Pat. Nos. 5,809,437 and 7,082,359 disclose such detection techniques, and sensors, and their entire contents are incorporated herein by reference as illustrative, non-limiting examples only.

Further, the control system may receive user commands to move the wheels to partly or completely out of/back into wheel recesses 9, but if a user command is foremoving the wheels back into wheel recesses 9, the control system may refuse the command, if it detects or determines an above-mentioned potential risk exists, or execute the command but issues a warning signal with information of the potential risk, to the user.

As an alternative, the above-mentioned sensors and techniques for detecting and/or determining the potential risks, are being used by an autonomous vehicle friendly infrastructure (AVFI) installed at roadside, not the control system, and the control system receives potential risk related information from the AVFI and uses it in the above-mentioned manner.

According to the ninth embodiment, an initial backward longitudinal movement of pod 6, which may be caused by an external frontal collision impact or other impact directly or indirectly, is being used by a mechanical device to cause the wheels to move out of wheel recesses 9, so as to allow further backward movement of pod 6, as well as the above-mentioned movements of pod 6, in relative to chassis 10, caused by the control system.

Specifically, rack and pinion techniques are used such that the backward longitudinal movement of pod 6 causes a rack to be moved, and which further cause an associated pinion to rotate, and the rotations of the pinion is used as an input of a gear box which is used for changing the rotation speed/force/ratio, and the output rotations of the gear box is used to turn another pinion, for causing another rack to move laterally, to move a shaft and its attached wheel, out of wheel recess 9.

As an alternative, the backward longitudinal movement of pod 6 causes a wedge attached to it, to move backward, which will push another wedge attached to a shaft, to move laterally, and thus the shaft and its attached wheel, is moved out of wheel recess 9.

Other conventional mechanical devices may be alternatively used instead.

According to a tenth embodiment, the control system determines if the present vehicle is carrying a pod, by means of a pressure sensor for sensing the weight of the pod, disposed in the chassis or support plane of the present vehicle, and for sending to the control system signals indicative of the presence or absence of the pod.

If the pod is not there, then the control system will cause at least one intrusion prevention device, to be activated and to move/extend to a predetermined position. The determination may be unnecessary if the control system itself causes the pod to move out of the present vehicle, in the above-mentioned manner. Other conventional techniques may also be used instead.

Further, the control system has sensors which may be a conventional movement/position detector for determining if the intrusion prevention device(s) is functioning normally, by directly or indirectly detecting if the intrusion prevention device(s), or a part thereof, has moved/extended to the predetermined position. For one instance, a device such as a camera preferably with artificial intelligent for processing image signal for recognising images, for detecting the physical position of the intrusion prevention device (and maybe the pod, too), or a part thereof.

For another instance, an electromechanical lock dedicated for locking the intrusion prevention device, or a part thereof, in its position when it has moved or extended to the predetermined position, so as to prevent it from moving or retracting back to its original position, and for sending a signal to the control system indicating whether the device is successfully locked or not. The above-mentioned IR emitter and receiver may be applied to detect the position of the locking pin of the electromechanical lock, for determining if the locking is successful.

Alternatively, by visual inspection, a human operator or a driver of the present vehicle, can know if the intrusion prevention device(s), or a part thereof, has moved/extended to the predetermined position, and the human may move/extend the device into the predetermined position himself, or control a machine arm or the likes, to do so.

And, an input device associated with the control system, may be used for receiving user input for indicating the intrusion prevention device is functioning normally or not.

If the intrusion prevention device(s) is determined as not functioning normally, the control system disables itself from receiving any request for driving the present vehicle. Alternatively, the control system may deny such a request, or allow the vehicle to be driven, autonomously or by a human driver, at a speed, which is lower than a permittable speed when the intrusion prevention device(s) is determined as functioning normally, and may be for a limited time and/or fora limited distance, for eg., allow the vehicle to go to a nearby parking site or repair center.

The control system will also issue a warning signal to request fora repair, and/or to alert other nearby vehicles of any possible risk, such as the present vehicle has an oil tank or battery pack on the chassis bottom, and an intrusion may cause an explosion.

According to an eleventh embodiment, conventional vibration detection devices are disposed at respective positions close to the wheels of the present vehicle, for detecting the vibrations of the wheels when the vehicle is moving, and the control system, basing on the detected vibrations, cause at least one vibrator to generate opposite vibrations. Desirably, the vibration detection devices are disposed in or attached to the suspensions disposed between the wheels and the chassis.

Theoretically, the opposite vibrations should be a waveform about 180 degree out of phrase with that of the detected vibrations, but should include adjustment for the travelling time for the detected vibration wave to go from the source, that is, a wheel, to the destination, that is, the vibrator, through the physical structure of the vehicle, not the air.

The adjustment can be obtained by conventional techniques basing on calculating the time for the vibration wave i to travel along the distance from the source to destination, or by trial and error, both may be performed by the control system.

One or more vibrators may be disposed in the chassis, the pod, or any where in between, for instance, support plane 4, 12, if exists.

Desirably, at least a vibrator is disposed in the vicinity of a suspension between the pod and the chassis (or support plane 4, 12, if exists), or within the suspension as a part thereof, and the suspension may be basing on any techniques used in a conventional suspension used between a wheel and a vehicle, and/or any conventional shock/noise absorption techniques.

The suspension may be rod shape and disposed in a cylindrical hole disposed in the chassis (or in the pod, or partly in the chassis and partly in the pod), and through the open end of the hole, one end of the suspension presses against the lower surface of the pod to push the pod, up from the chassis, to absorb shocks. The vibrator may be disposed in between that one end of the suspension, and the lower surface of the pod.

And, the suspension rod is in series with a telescopic device in the hole, or include such a telescopic device inside as a part thereof, such that the telescopic device pushes the suspension outward to support the pod, when the pod rests on the chassis, and withdraws the suspension into the hole, if the pod is moved away, under the control of the control system.

It should be noted that the above embodiments/examples/modifications/alternatives are given by way of examples only, and it will be obvious to those skilled in the art that various changes and modifications on any one or any combination of them, may be made without departing from the spirit of the present invention.

What is claimed is:

1. An apparatus for use on a vehicle, said vehicle including a main body and a sub-body, and when said vehicle being in normal operation such as moving on a road, said sub-body is being laid on said main body;

wherein at least one recess of said sub-body, is being disposed on one or both lateral sides of said sub-body, for accommodating a portion of corresponding respective at least one road-running wheel of said vehicle, and as a result, said at least one road-running wheel constituting a hindrance to longitudinal and/or lateral relative movement between said sub-body and said main body;

wherein said apparatus comprising:
   a controlling system;
   a sub-body positioning system, under control of said controlling system, configured to facilitate said relative movement by detaching said sub-body from said main body and also, configured to not allow said relative movement by attaching said sub-body and said main body directly or indirectly;
   a detection system, under control of said controlling system, configured to detect a collision or an imminent collision involving said vehicle, and to provide related collision information;
   a device configured to, under control of said controlling system, cause said at least one road-running wheel to make a telescopic movement out of said at least one recess, so as to facilitate said relative movement;
   wherein when said sub-body positioning system facilitating said relative movement between said sub-body and said main body, said relative movement happening only if being caused by a collision force directly or indirectly on said sub-body, exceeding a limit, thereby avoiding a greater damage to said sub-body which would happen if said sub-body positioning system being not allowing said relative movement;
   wherein said controlling system controlling both said sub-body positioning system and said device to allow facilitate relative movement, according to said collision information directly or indirectly.

2. An apparatus as claimed in claim 1, wherein said lateral relative movement of said sub-body may happen, for a distance limited by said moved at least one road-running wheel, and said relative movement of said sub-body may be caused by a moving system, under control of said controlling system.

3. An apparatus as claimed in claim 1, wherein at least one of two wheels at two opposite sides of said vehicle are being moved outward from their respective recesses by said device, under control of said controlling system, and said sub-body positioning system also being configured to, under control of said controlling system, cause said sub-body to be moved toward a said wheel which is being moved more outward, in order that said two wheels are both out of their respective recesses completely, so as to eliminate said hindrance;

wherein another said wheel being not moved at all, or being not moved out of its recess completely by said device.

4. An apparatus as claimed in claim 1, wherein further comprising a moving system configured to move said sub-body in relative to said main body;

wherein said controlling system controlling both said sub-body positioning system and said device to facilitate said relative movement, according to said collision information directly or indirectly, before controlling said moving system to perform said longitudinal relative movement.

5. An apparatus for use on a vehicle, said vehicle including a main body and a sub-body, and when said vehicle being in normal operations such as moving on a road, said sub-body is being laid on said main body;
  wherein at least one recess of said sub-body, is being disposed on one or both lateral sides of said sub-body, for accommodating a portion of corresponding respective at least one road-running wheel of said vehicle, and as a result, said at least one road-running wheel constituting a hindrance to longitudinal and/or lateral relative movement between said sub-body and said main body;
  wherein said apparatus comprising:
  a sub-body position managing system configured to carry out a first operation to facilitate said relative movement, by detaching said sub-body from said main body partially or completely, and also, configured to carry out a second operation to prevent said relative movement, by attaching said sub-body to said main body directly or indirectly;
  a wheel-moving device configured to carry out a third operating to move said at least one road-running wheel out of said at least one recess, telescopically and/or retractably, and thereby, eliminating said hindrance and facilitating said relative movement;
  wherein said operation being in association directly or indirectly with said third operation, so that both said first operation and said third operation playing a part in facilitating said relative movement.

6. An apparatus as claimed in claim 5, wherein at least one of two wheels at two opposite sides of said vehicle are being moved outward from their respective recesses by said wheel-moving device, and said sub-body position managing system also being configured to cause said sub-body to be moved toward a said wheel which is being moved more outward, in order that said two wheels are both out of their respective recesses completely, so as to eliminate said hindrance;
  wherein another said wheel being not moved at all, or being not moved out of its recess completely by said wheel-moving device.

7. An apparatus as claimed in claim 5, wherein said sub-body having a tubular structure inside, said tubular structure being of uniform or substantially uniform cross section, and when said vehicle being in said normal operations, said sub-body is being laid on a predetermined position of said main body, and said tubular structure being lying on said main body laterally, and said tubular structure being detachably secured to said sub-body and said main body, directly or indirectly;
  wherein two recesses being disposed at two ends of said tubular structure, for accommodating two portions of corresponding respective two road-running wheels of said vehicle, said portions not including any ground touching part of said wheels;
  wherein further comprising:
  a detaching system configured to detach directly or indirectly said tubular structure from said sub-body, and as a consequence, said lateral relative movement may happen and unhindered by any wheels inside said two recesses;
  wherein said detaching system also being configured to detach or directly or indirectly said tubular structure from said main body, and as a consequence, said longitudinal relative movement may happen.

8. An apparatus as claimed in claim 7, wherein further comprising another detaching system configured to detach directly or indirectly said sub-body from said main body;
  wherein said lateral movement of said sub-body taking place after said another detaching system having detached said sub-body from said main body; or alternatively, said sub-body being forcibly moved from said main body by a collision impact;
  wherein said detaching system and said another detaching system may be a part of the same system.

9. An apparatus as claimed in claim 5, wherein further comprising a moving system configured to carry out a fourth operation to move said sub-body relative to said main body:
  wherein said fourth operation being associated directly or indirectly with said first operation and said third operation, so that all said first, third and fourth operations playing a part in performing said longitudinal relative movement.

10. An apparatus as claimed in claim 9, wherein said sub-body being transferred to another platform by said relative longitudinal movement on said main body.

11. An apparatus as claimed in claim 5, wherein at least two recesses of said sub-body, is being disposed on both lateral sides of said sub-body, for accommodating a portion of corresponding a respective at least two road-running wheels of said vehicle, and as a result, said at least two road-running wheels constituting said hindrance to longitudinal relative movement between said sub-body and said main body;
  wherein said apparatus further comprising:
  a potential collision risk status system configured to detect, determine or obtain potential frontal collision risk status of said vehicle;
  a detection system configured to detect a collision or an imminent collision of said vehicle;
  wherein said wheel-moving device also being configured to move said at least two road-running wheels outward of or backward into said at least two recesses, partly or completely, if said potential frontal collision risk status turning high or low corresponding respectively;
  wherein said wheel-moving device also being configured to move said at least two road-running wheels out of said at least two recesses, for eliminating said hindrance, if said collision being detected by said detection system.

12. An apparatus as claimed in claim 5, wherein further comprising:
  a detection system configured to detect a collision or an imminent collision of said vehicle;
  a module configured to receive a user command;
  wherein at least two recesses of said sub-body, is being disposed on both lateral sides of said sub-body, for accommodating a portion of corresponding respective at least two road-running wheels of said vehicle, and a result, said at least two road-running wheels constituting said hindrance to longitudinal relative movement between said sub-body and said main body;
  wherein said wheel-moving device also being configured to be caused by said command, to move said at least two road-running wheels out or back into said at least two recesses, partly or completely;
  wherein said wheel-moving device also being configured to move said at least two road-running wheels out of said at least two recesses, for eliminating said hindrance, if said collision being detected by said detection system.

13. An apparatus as claimed in claim 5, wherein when said sub-body position managing system facilitating said relative movement between said sub-body and said main body, said relative movement happening only if being caused by a collision force directly or indirectly on said sub-body, exceeding a limit, thereby avoiding a greater damaging to said sub-body which would happen if said sub-body positioning system preventing said relative movement.

14. An apparatus as claimed in claim 13, wherein further comprising:
   a controlling system;
   a detection system configured to, under control of said controlling system, detect a collision or an imminent collision involving said vehicle, and to provide related collision information;
   wherein said controlling system causing both said sub-body position managing system and said wheel-moving device to facilitate said relative movement, in response to said collision information directly or indirectly, which indicative of a frontal collision, or an imminent frontal collision detected.

15. An apparatus for enhancing safety of a vehicle, said vehicle including a main body and a sub-body, and when said vehicle being in a normal operations such as moving on a road, said sub-body is being laid on said main body;
   wherein at least one recess of said sub-body, is being disposed on one or both lateral sides of said sub-body, for accommodating a portion of corresponding respective at least one road-running wheel of said vehicle, and as a result, said at least one road-running wheel constituting a hindrance to longitudinal relative movement between said sub-body and said main body;
   wherein said apparatus comprising:
   a movable device configured to be caused to make a movement by a collision impact on said vehicle directly or indirectly;
   a mechanical device which being not a shock detector, configured to mechanically convert said movement of said movable device, into an actuation to directly or indirectly cause said at least one road-running wheel to be moved out of said at least one recess, telescopically and/or retractably, so as to eliminate said hindrance.

16. An apparatus as claimed in claim 15, wherein said movement being a backward movement and said movable device being said sub-body;
   wherein further comprising a detachment system;
   wherein said motion taking place after said detachment system having detached said sub-body from said main-body; or alternatively, said sub-body being forcibly detached from said main body by said collision impact.

17. An apparatus for use on a vehicle, said vehicle including a main body and a sub-body, and when said vehicle being in normal operations such as moving on a road, said sub-body is being laid on said main body;
   wherein at least one recess of said sub-body, is being disposed on one or both lateral sides of said sub-body, for accommodating a portion of corresponding respective at least one road-running wheel of said vehicle, and as result, said at least one road-running wheel constituting a hindrance to longitudinal relative movement between said sub-body and said main body;
   wherein said apparatus comprising:
   a system configured to carry out a first operation to move said sub-body in relative to said main body;
   a wheel-moving device configured to carry out a second operation to move said at least one road-running wheel out of said at least one recess, telescopically, and thereby, eliminating said hindrance and facilitating said relative movement;
   wherein said first operation being in association directly or indirectly with said second operation, so that both said first operation and said second operation playing a part in performing said longitudinal relative movement.

18. An apparatus as claimed in claim 17, wherein said system also being configured to carry out a third operation to prevent said relative movement.

* * * * *